United States Patent [19]

Tsai

[11] Patent Number: 4,878,038
[45] Date of Patent: Oct. 31, 1989

[54] CIRCUIT PROTECTION DEVICE

[76] Inventor: James T. Tsai, 5109 Glenbrook Dr., Vienna, W. Va. 26105

[21] Appl. No.: 129,651

[22] Filed: Dec. 7, 1987

[51] Int. Cl.$^4$ .................. H01H 61/02; H01H 71/16; H02H 5/04

[52] U.S. Cl. .................................. 337/107; 337/102; 338/22 R; 361/106

[58] Field of Search .................... 361/106; 338/22 R; 337/102–107, 404, 377

[56] References Cited

U.S. PATENT DOCUMENTS 4,329,726  5/1982  Middleman et al. ............. 338/22 R Primary Examiner—H. Broome
Attorney, Agent, or Firm—Robert Charles Hill

[57] ABSTRACT

Multiple embodiments of a device suitable for arrangement in a circuit for protection of components in the circuit are disclosed, the device of each embodiment including a temperature responsive electrical regulating component including a conductive polymer or ceramic material having an electrical regulating capability dependent on temperature and at least one series connected switch including trip means also responsive to temperature for opening and closing the circuit in a reliable manner, the device being adapted for connection in the circuit to be protected. The various embodiments include different arrangements of the temperature responsive electrical regulating component and the switch. Certain of the embodiments include a second series connected switch of similar construction. The conductive polymer or ceramic material can be of a variety of types for performing different electrical regulating functions within the circuit.

21 Claims, 4 Drawing Sheets

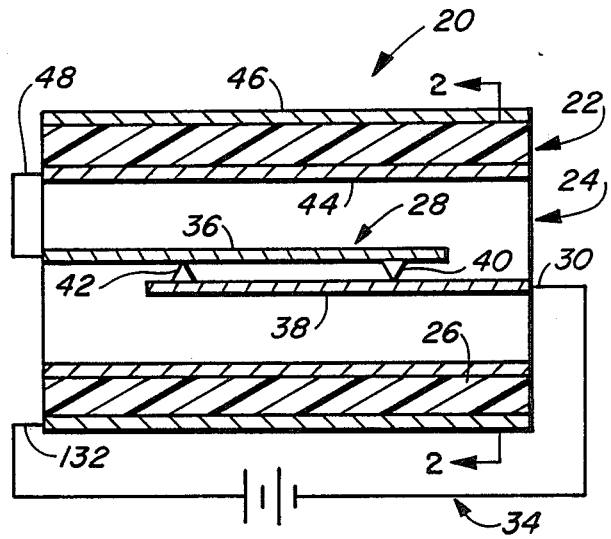
FIG._1.
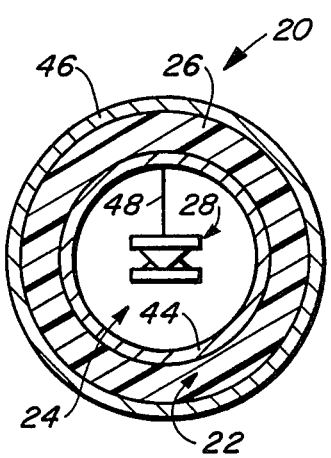
FIG._2.
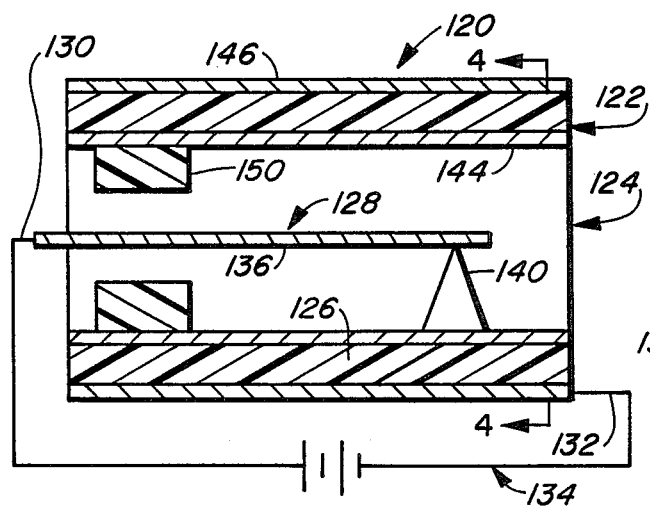
FIG._3.
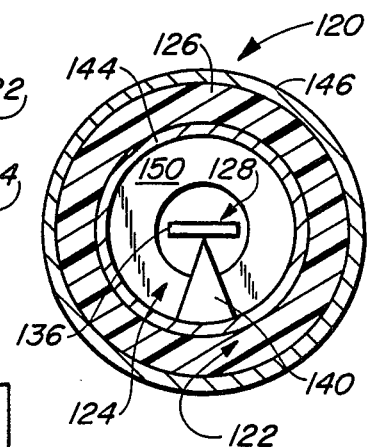
FIG._4.

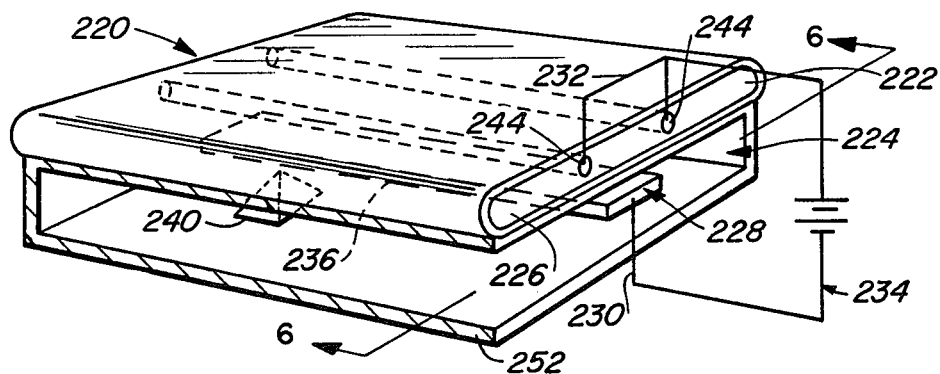
FIG._5.
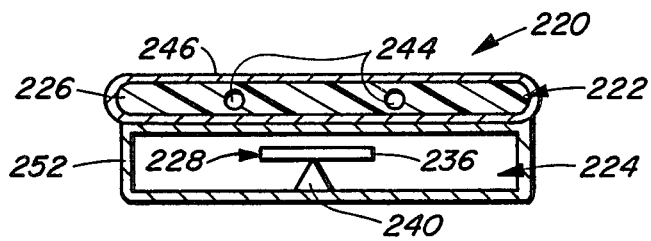
FIG._6.
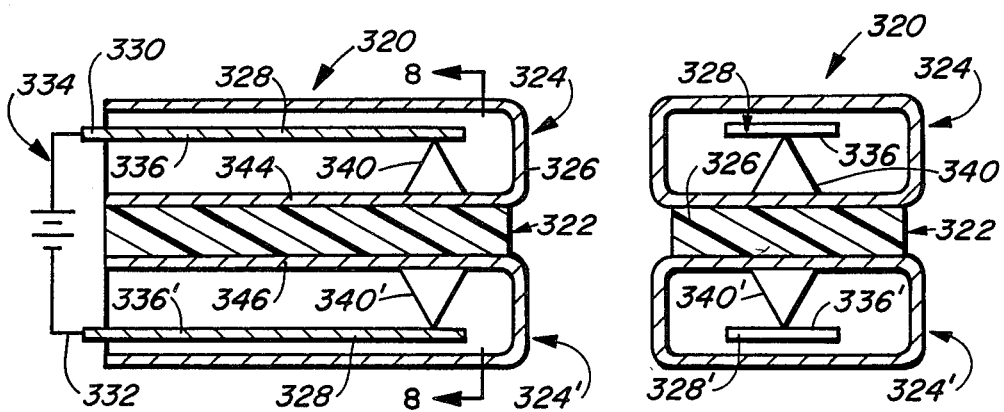
FIG._7.
FIG._8.

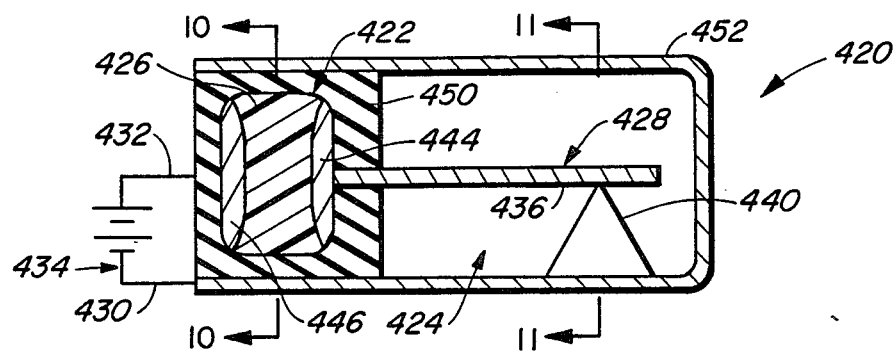
FIG._9.
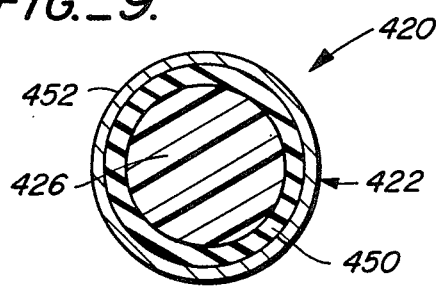
FIG._10.
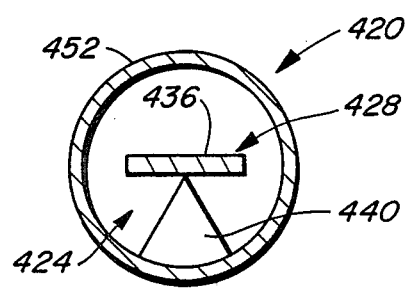
FIG._11.
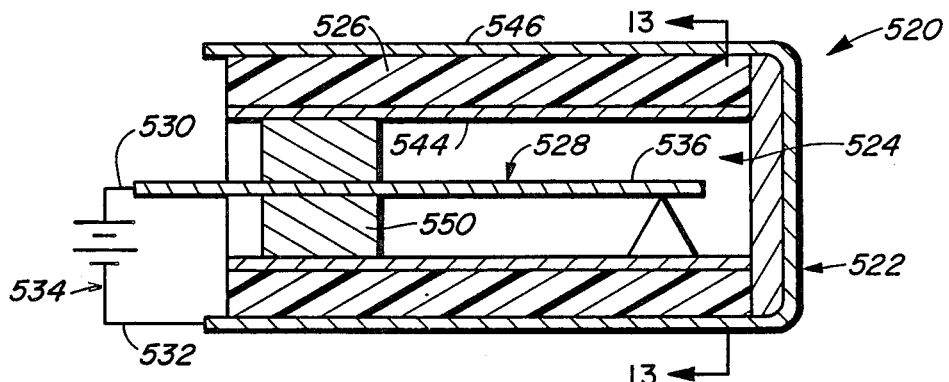
FIG._12.
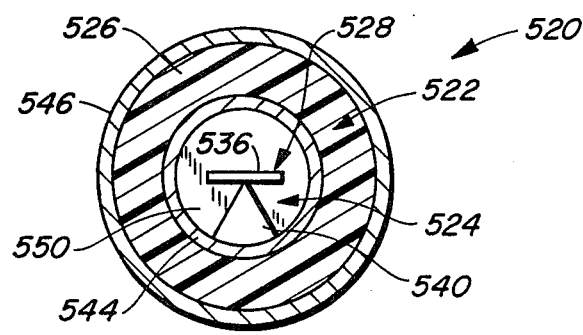
FIG._13.

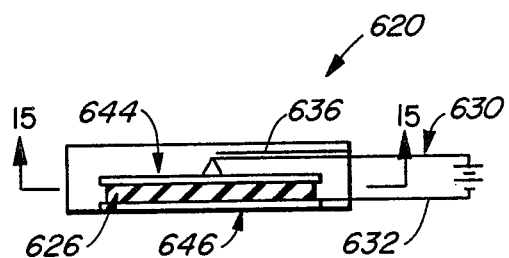
FIG._14.
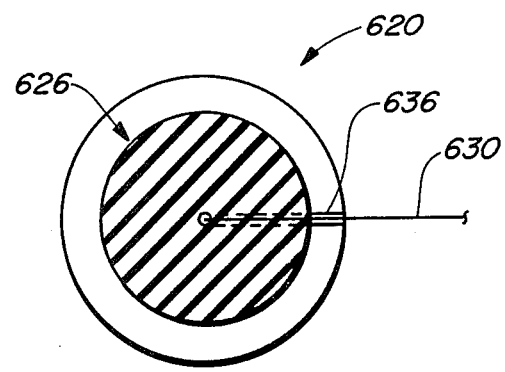
FIG._15.
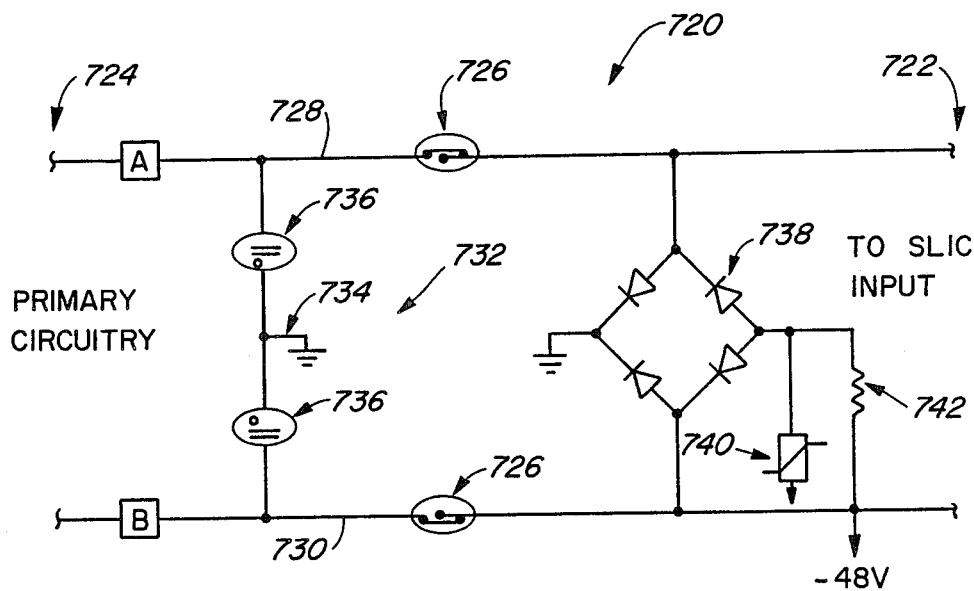
FIG._16.

CIRCUIT PROTECTION DEVICE

FIELD OF THE INVENTION

The present invention relates to a device for (1) protection of components within a circuit and (2) control and over-temperature protection of heating elements, and more particularly to such a device which functions in response to temperature.

BACKGROUND OF THE INVENTION

Substantial development has taken place in connection with circuit protection devices of a type including resistivity-temperature sensitive, conductive polymeric or ceramic material. In the presence of sufficiently low currents, the resistive heating of the conductive polymer is inadequate to disturb its low resistance state equilibrium. Alternatively, overcurrent or overtemperature conditions tend to cause the conductive polymer or ceramic material to self-heat at a rate faster than its thermal dissipation rate. At the same time, resistivity of the conductive polymer rises sharply and causes a reduction of current passing through the said material. As discussed in greater detail below, various forms of the polymer are available for regulating different electrical parameters such as power or wattage.

In any event, electrical conductivity of the polymeric material can be increased significantly by incorporation of adequate conductive filler, for example, carbon black or metal particles. The electrical resistivity of the conductive polymer is determined by the type of conductive particles and the volumetric ratio of total conductive particles in the polymer.

Particular interest has developed in compositions of which resistivity exhibit positive temperature characteristics, commonly referred to as "PTC". These materials exhibit a very rapid increase in resistivity over a selected temperature range. The temperature at which the resistance commences to increase sharply is often designated the switching or autotherming temperature. On reaching that temperature, the conductive polymer exhibits an anomalous change in resistance which, for practical purposes, electrically switches off a heater or other device with which the conductive polymer is associated.

The conductivity of many ceramics is significantly influenced by both ionic and electronic defects. Many oxides are metallic conductors and exhibiting positive-temperature-coefficient (PTC). The perovskite- and rutile-structure oxides are the most frequently studied. Examples of PTC ceramics are doped barium titanate, $BaTiO_3$ with small amount of CuO. Polycrystalline ZnO with $Bi_2O_3$ and other additives has nonohmic conduction and is used as a voltage-dependent resistor. Reference of ceramics as electrical materials can be found in the *Encyclopedia of Chemical Technology*, Vol. 5 pp 290 (by H. K. Bowen) 1984 John Wiley Son, Inc. N.Y.

Additional characteristics concerning ceramic material suitable for use within the present invention are disclosed for example in W. D. Kingery, H. K. Bowen and D. R. Uhlman *Introduction to Ceramics, Second Addition*, John Wiley & Son, Inc., N.Y. 1976 and U.S. Pat. No. 4,486,651 issued Dec. 4, 1984 to Kinya Atsumi, et al and assigned to Nippon Soken, Inc. and entitled Ceramic Heater. Those references are accordingly incorporated as though set forth herein in their entirety.

Another well known type of conductive polymer is commonly referred to as a constant wattage type or "ZTC". These materials have the ability to regulate overall power or wattage in a circuit rather than current as with the PTC materials. The relatively constant resistance in the temperature range of normal operation results in a constant wattage heating behavior.

Rather than including a detailed discussion of such materials which are well known in the prior art, reference is made below to a number of prior U.S. patents, all of which are incorporated herein by reference as though set forth in their entirety in order to assure a proper understanding of the various possibilities for conductive polymers as temperature responsive electrical regulating components in connection with the present invention.

For example, it has been proposed to use devices comprising conductive polymer for protecting circuits against fault conditions arising from excessive temperatures and/or electrical currents. For example, U.S. Pat. No. 2,978,665 issued Apr. 4, 1961 to Vernet, et al disclosed the use of such materials in devices for regulating electrical current. Further developments in such devices were disclosed, for example, by U.S. Pat. Nos. 3,243,753 and 3,351,882 issued respectively on Mar. 29, 1966 and Nov. 7, 1967 to Kohler.

Subsequently, U.S. Pat. No. 4,352,083 issued Sept. 28, 1982 to Middleman, et al further referred to the use of such materials in circuit protection devices. That patent was also of interest in that it included a substantial bibliography of U.S. patents and other publications relating particularly to the use of conductive polymers in such circuit protection devices. The Middleman, et al patent and the other patents referred to therein are incorporated herein as though set forth in their entirety in order to assure an understanding of the capabilities and versatility of such materials.

In an overview of uses for conductive polymers in circuit protection devices, a number of problems have tended to limit their use in circuit protection devices or to eliminate them entirely from consideration in the past.

Initially, it has been found that, when conductive polymers are employed as overcurrent protectors, resistivity of the conductive polymer is not uniformly stable with respect to mechanical stress and temperature cycling. For example, a number of thermal cycles, possibly ten to fifteen cycles, near the melting point of the conductive polymer may drastically reduce the autotherm height or level for the material. This will obviously jeopardize the ability and reliability of the conductive polymer to provide circuit protection. Furthermore, the reduction of the autotherm height may also lead to thermal runaway of the conductive polymer which in turn will result in flame failure for the device including burning of the conductive polymer.

A second problem arising from the use of conductive polymers as resistors in such devices resides in the high autotherm or trip temperature characteristic of most high performance polymers. For example, most high performance polymers such as the general class of fluoropolymers exhibit very high melting points or trip points typically 250° Centigrade. Thus, even with the desirable properties of such high performance polymers, their use tends to be excluded in most electronic circuits or systems.

Yet another problem which has been found to exist in connection with the use of such conductive polymers is their tendency to exhibit a small residue current rather than a true open circuit after reaching a predetermined set temperature or trip point. Because of this characteristic, a limited amount of current, depending on the aging and stability of the composite, tends to flow within the circuit even above the predetermined set temperature or trip point. This characteristic minimizes the desirability of such devices in certain applications and even totally eliminates the possibility of their use in other applications such as primary circuit protection where a true open circuit is required above the predetermined set temperature or trip point.

Other limitations or problems have been found to exist in connection with conductive polymers and ceramics such as those discussed above. The problems summarized immediately above are believed to be particularly representative of other undesirable characteristics which may be encountered in the use of conductive polymers and ceramics. In any event, there has been found to remain a need for circuit protection devices including conductive material while being able to minimize or overcome problems such as those outlined above.

SUMMARY OF THE INVENTION

Accordingly, it is an object of the present invention to provide an improved electrical protection device including temperature responsive conductive material while overcoming one or more problems such as those referred to above.

More specifically, it is an object of the invention to provide an improved electrical protection and current regulating device including trip means operable in a reliable and predictable manner.

It is yet another object of the invention to provide an electrical protection device which will perform to develop a true open circuit while providing an automatic reset capability.

Yet another object of the invention is to provide such an electrical protection and current regulating device adapted for the use of high performance polymers while including means for setting the trip point independent of the crystal melting point for the high performance polymer itself.

Yet another object of the invention is to provide such a device adapted for the use of ceramic conductive materials which have excellent oxidation resistance while including means for setting the trip point independent of the ceramic trip temperature and reducing the dependency of PTC variation caused by composition drift and variations in processing conditions.

In achieving one or more of these objects, the present invention provides a circuit protection and temperature regulating device having a temperature responsive electrical regulating means including a PTC or ZTC material means which provides an electrical resistance heating, a switch means arranged in series with the temperature responsive electrical regulating means and including trip means for opening the circuit and positively terminating current flow in a reliable manner, and means for connecting the device in the circuit.

Within such a combination, the conductive polymer or ceramic material may be selected for regulating current flow within the circuit, for regulating power or wattage within the circuit or for regulating other electrical characteristics as desired.

It is yet another related object of the invention to provide such a combination for a circuit protection device having a variety of physical configurations depending upon the particular application for the device. For example, a substantial number of embodiments are disclosed in the following description for use in different applications.

It is a still further object of the invention to provide a circuit protection device including a temperature responsive electrical regulating means including a high performance conductive polymer characterized by a particular crystal melting point and a switch means arranged in series with the temperature responsive electrical regulating means, the switch means including temperature responsive means for opening the circuit and positively terminating current flow at a trip point independent of the crystal melting point of the conductive polymer means.

In most or all of the circuit protective devices summarized above, it is an object of the invention to provide the temperature responsive electrical regulating means and at least one switch means whereby the temperature responsive electrical regulating means provides electrical regulation for the circuit dependent upon ambient temperature and the switch means positively opens and closes the circuit also dependent upon temperature.

Yet a further object of the invention is to employ the electrical protection device of the present invention in a variety of circuits to provide protection for a primary circuit portion. In this regard, the term "primary circuit" is employed generally to designate any circuit components for which it is desried to provide protection of the type contemplated by the present invention. In particular, one embodiment of the invention as described in greater detail below illustrates the circuit protection device of the invention employed in a subscriber loop interface circuit of a type commonly employed in telecommunications. This embodiment is intended only to provide one example for use of the present invention and is in no way intended to limit the invention. Any of the embodiments of the circuit protection device of the present invention as described in greater detail below may similarly be employed for use in such circuits. However, it will be apparent that certain embodiments of the invention have particular characteristics which may make them more desirable for use in selected individual applications or circuits.

Additional objects and advantages of the present invention are made apparent in the following description having reference to the accompanying drawings.

BRIEF DESCRIPTION OF THE DRAWINGS

FIG. 1 is an axially sectioned view of one embodiment of a circuit protection device constructed according to the present invention.

FIG. 2 is a view taken along section line II—II of FIG. 1.

FIG. 3 is also an axially sectioned view of yet another embodiment of a circuit protection device constructed according to the present invention.

FIG. 4 is a view taken along section line IV—IV of FIG. 3.

FIG. 5 is a perspective view of still another embodiment of a circuit protective device constructed according to the present invention.

FIG. 6 is a view taken along section line VI—VI of FIG. 5.

FIG. 7 is similarly an axially sectioned view of a still further embodiment of a circuit protection device constructed according to the present invention and including two switches arranged in a series with a single temperature responsive electrical regulating component.

FIG. 8 is a view taken along section line VIII—VIII of FIG. 7.

FIG. 9 is yet another axially sectioned view of a circuit protection device constructed in accordance with the present invention.

FIGS. 10 and 11 are views taken respectively along section lines X—X and XI—XI of FIG. 9.

FIG. 12 is also an axially sectioned view of yet another embodiment of a circuit protection device according to the present invention.

FIG. 13 is a view taken along section line XIII—XIII of FIG. 12.

FIG. 14 is also an axially sectioned view of yet another embodiment of a device according to the present invention.

FIG. 15 is a view taken along section line XV—XV of FIG. 14.

FIG. 16 is a schematic representation of a portion of a subscriber loop interface circuit for use in telecommunications, for example, while employing at least one circuit protection device according to the present invention.

DESCRIPTION OF THE PREFERRED EMBODIMENTS

As indicated above, the present invention provides a circuit protection device 20 adapted for improved protection of components within the circuit. Referring particularly to FIGS. 1 and 2, each of the embodiments of the present invention is characterized by the combination of a temperature responsive electrical regulating means, as generally indicated at 22 in FIG. 1 arranged in series with at least one switch means 24 in each of the embodiments. The temperature responsive electrical regulating means such as that indicated at 22 in FIGS. 1 and 2 includes a conductive polymer or ceramic material means 26 having an electrical regulating capability dependent upon temperature. The conductive material 26 can be either a conductive polymer or conductive ceramic or a combination of two materials, preferably laminated in series. Similarly, the switch means 24 includes trip means 28 for opening the circuit and positively terminating current flow in a reliable manner. Finally, each of the embodiments includes means such as the contacts 30 and 32 for connecting the device 22 into a circuit such as that indicated at 34 in FIG. 1.

The switch means 24 in each of the embodiments may be considered as a conventional switch component in itself, commonly referred to, for example, as a bimetallic switch or a ferrite magnetic switch capable of opening or closing the circuit in response to temperature variations. Thus the present invention is very useful for current protection applications since the switch means or bimetallic switch exhibits a thermostat function of positively cutting off current flow within the circuit.

Similarly, the above combination permits double protection of a circuit. In particular, the conductive polymer means 26 within the temperature responsive electrical regulating means serves to provide electrical regulation in response to temperature. However, if the conductive polymer is susceptible, for example, to runaway overheating, the switch means or bimetallic switch functions to open the circuit and protect the conductive polymer from damage.

The device of the present invention is thus suitable for use in a wide variety of applications including current limiting, electrical energy limiting, energy absorption and arc suppression. In addition to protecting a battery during charging, it is also possible to employ the device of the invention to protect the battery and its surroundings from excessive discharge rates caused by shorting or improper use, especially in hazardous environments where arcing or high temperatures may result in explosions. The device of the present invention meets this need by limiting the total energy which can be passed through the circuit under overcurrent conditions.

The current limiting capability of the device of the present invention also adapts it for use as a reusable fuse. The remote reset feature of the invention allows convenient resetting while eliminating field replacement.

Power supplies employed by telephone companies are now commonly required to be energy-limited under short-circuit conditions. Accordingly, this is yet another application for which the device of the present invention is particularly suited.

With the broad understanding of the invention provided by the above description and discussion of possible applications, different embodiments are described in greater detail below for use in a variety of applications.

Initially, to complete the description of the embodiment in FIGS. 1 and 2, the trip means 28 for the switch means 24 is formed with double reeds 36 and 38. Each of the reeds 36 and 38 includes a contact point 40 or 42 for engagement with the other reed. Both of the reeds 36 and 38 are of bimetallic construction or ferrite magnetic means so that they are responsive to temperature in the manner described above.

The conductive polymer 26 for the temperature responsive electrical regulating means 22 is formed of annular or cylindrical configuration with the conductive polymer 26 arranged in spaced apart relation about the switch means 24. Conductive surfaces or conductors 44 and 46 are formed on inner and outer surfaces respectively of the conductive polymer 26. The conductors 44 and 46 are in both physical and conductive engagement with the conductive polymer 26.

The inner conductive surface or conductor 44 also forms a cylindrical housing for the switch means 24. The inner conductive surface or conductor 44 is also in conductive engagement with the one bimetallic reed 36 as indicated at 48.

Thus, the switch means 24 and the temperature responsive electrical regulating means 22 are both interconnected in series relation with the circuit 34. The conductive polymer 26 may be formed of any suitable material such as a PTC or ZTC material as described in greater detail above, depending upon the particular electrical characteristic to be controlled by the regulating means 22.

At the same time, the circuit 34 may be of any type, depending upon the particular application, including a telecommunication equipment primary circuit and battery charging protection for which the present invention is particularly adapted to provide protection as also described in greater detail above.

Referring now to FIGS. 3 and 4, another embodiment of a circuit protective device according to the present invention is generally indicated at 120 with basic components similar to those described above in connection with the embodiment of FIGS. 1 and 2. In the embodiment of FIGS. 3 and 4, a single bimetallic reed switch or a ferrite magnetic switch member 136 is fixed at its left end as viewed in FIG. 3 while being free for movement in response to temperature variations at its right end for moving into and out of engagement with a contact point 140. The contact point 140 is arranged upon and in conductive engagement with the inner conductor 144 for the temperature responsive electrical regulating means 122.

The inner conductor 144 also forms a housing for the switch means 124. In the embodiment of FIG. 3, the inner conductor or housing 144 is closed at its right end as may be best seen in FIG. 3. Annular insulation 150 is arranged within the leftward end of the inner conductor or housing 144 both to support the reed switch 136 and to prevent it from making undesired contact with the inner conductor or housing 144. Otherwise, the embodiment of FIGS. 3 and 4 includes additional features similar to those referred to by corresponding numerical labels in the embodiment of FIGS. 1 and 2.

Again, the conductive material 126 can be either a conductive polymer of a conductive ceramic or a combination of two suitable materials, preferably laminated in series.

The circuit protection device 120 of FIGS. 3 and 4 is generally adapted for use in the same type of applications as the device 20 of FIGS. 1 and 2. In addition, the device 120 is adapted for use in PTC heaters to prevent over-temperature excursions.

Referring now to FIGS. 5 and 6, yet another embodiment of a circuit protection device constructed according to the present invention is indicated at 220 and again includes basic components corresponding to those described above in connection with the embodiment of FIGS. 1 and 2 with corresponding numerical labels.

In the embodiment 220 of FIGS. 5 and 6, the switch means 224 and the temperature responsive electrical regulating means 222 are arranged in adjacent and conductive relation rather than in coaxial relation as in the embodiments of FIGS. 1-2 and 3-4.

Within the temperature responsive electrical regulating means 222, two or more inner conductive means or conductors 244 are formed as wires embedded within the conductive polymer 226. The outer conductive surface or conductor 246 is formed as a conductive mesh element, formed, for example, from woven conductive wire or the like, surrounding the conductive polymer 226 in physical and electrically conductive relation therewith. The switch means 224 is formed with a separate housing 252 which is also conductive and is arranged adjacent and in conductive relation with the outer conductive surface or conductor 46 for the temperature responsive electrical regulating means 222. The contact point 240 is arranged in electrically conductive relation upon the housing 252.

Here again, the other components in the embodiment of FIGS. 5 and 6 can be generally similar to the corresponding components described above in connection with the embodiment of FIGS. 1 and 2. In any event, because of its generally similar components, the embodiments of FIGS. 5 and 6 can also be employed in generally the same type of applications referred to above.

Referring now to FIGS. 7 and 8, yet another embodiment of a circuit protection device constructed according to the present invention is indicated at 320 and again includes generally similar features as in the preceding embodiments. However, the embodiment 320 of FIGS. 7 and 8 includes both a first switch means 324 generally corresponding to the switch means in the preceding embodiments and also a second switch means 324' of substantially similar construction as the first switch means 324.

In this embodiment, the inner and outer conductors 344 and 346 respectively form the housings for the first and second switch means 324 and 324'. The contact points 340 and 340' for the first and second switch means 324 and 324' are respectively arranged both in physical and electrically conductive relation upon the respective housings 344 and 346.

Because the two conductive surfaces 344 and 346 also form the housings for the first and second switch means 324 and 324', the switch means and the temperature responsive electrical regulating means 322 are all arranged in series relation with the circuit 334 through the contacts 330 and 332.

Here again, the circuit protection device embodiment of FIGS. 7 and 8 can be employed in generally similar applications as the other embodiments above. However, the first and second switch means 324 and 324' can either be employed to provide redundancy within the device or they can be arranged and constructed to have trip points at different temperatures if desired for a particular application. Other variations for this embodiment are also obvious from its construction, for instance, switch means 324 is a bimetallic type and switch means 324' is a ferrite magnetic type.

Referring now to FIGS. 9–11, still another embodiment of a circuit protection device constructed according to the present invention is illustrated at 420.

In the embodiment 420, the switch means 424 is formed with a conductive housing 452 which is entirely separate from the inner and outer conductive surfaces or conductors 444 and 446 for the temperature responsive electrical regulating means 422.

The housing 452 for the switch means is of cylindrical configuration with the single reed switch 436 arranged generally at one end thereof having a movable end arranged for engagement with a contact point 440 physically supported and in electrically conductive relation with the housing 452. The other end of the reed switch 436 is fixed on one of the conductive surfaces 444 for the temperature responsive electrical regulating means 422. The entire temperature responsive electrical regulating means 422 is supported and encased in the left end of the housing 452 by means of an insulating element 450.

The one contact 430 is in engagement with the housing 452 while the other contact 432 is in electrical engagement with the conductive surface or conductor 446. Accordingly, the temperature responsive electrical regulating means 422 and the switch means 424 are also in series relation with the circuit 434.

The embodiment 420 of FIGS. 9–11 can also be employed in generally the same applications referred to above. However, the configuration for the embodiment of FIGS. 9–11 particularly adapts it in certain applications, for example, because of its compact size. Otherwise, the embodiment 420 of FIGS. 9–11 includes additional components generally similar to those described above with corresponding numerical labels.

Referring now to FIGS. 12 and 13, still another embodiment of a circuit protection device constructed according to the present invention is generally indicated at 520. This embodiment is generally similar in construction to the embodiment of FIGS. 1 and 2 except that the outer conductive surface or conductor 546 also is closed at its right end as illustrated, for example, in FIG. 12 to form a housing for the entire circuit protection device 520. The switch means 524 is formed with a single reed switch 536 as in the embodiment of FIGS. 3 and 4. The embodiment 520 also includes annular insulation 550 for supporting the left end of the reed switch 536 also as described above in connection with the embodiment of FIGS. 3 and 4. Otherwise, the embodiment 520 includes components similar to those described in the other embodiments with corresponding numerical labels.

In the embodiment 520 of FIGS. 12 and 13, the contact point 540 could also be arranged in direct electrical contact with the conductive polymer 526. This avoids the need for the inner conductive surface or conductor 544 included in the embodiment 520. With the annular insulation 550 mounting the reed switch 536 directly upon the conductive polymer 526, the same series arrangement is provided.

The circuit protection device 520 of FIGS. 12 and 13 is also capable of use in similar applications as the other embodiments referred to above.

Referring to FIGS. 14 and 15, still another embodiment of a circuit protection device constructed according to the present invention is generally indicated at 620. This embodiment is genreally similar in construction to the embodiment of FIGS. 9-11. However, the device 620 has a disc shape or configuration which substantially reduces its dimensions or overall size.

In the device 620, a switch means 624 is formed with a single reed 636 mounted directly on a conductive electrode 644. Temperature responsive material 626 is electrically connected within the device by the electrode 644 and another electrode 646. Lead wires 630 and 632 provide electrical connection as in the other embodiments.

It is again noted that any of the devices indicated at 226, 322, 426, 526 or 626 in the various figures can be formed from either a conductive polymer or conductive ceramic or a combination of two materials, preferably laminated in series.

Referring now to FIG. 16, one embodiment of a protection circuit is indicated at 720 adapted for use with a subscriber loop interface circuit (SLIC) represented by the input 722. The subscriber loop interface circuit, as noted above, is of a type commonly employed in the telecommunications filed. Accordingly, no further description is believed necessary in that regard.

The protection circuit 720 is employed for providing protection of the type discussed in detail above for primary circuitry 724 which is interconnected with the protection circuit 720 through terminals A and B. As noted above, the term "primary circuit" is employed to designate major circuit components requiring protection of the type provided by the present invention. For example, the primary circuit may include power supplies and complex circuitry particularly susceptible to damage from electrical power surges and the like.

In any event, the protection circuit includes separate circuit protection devices 726 respectively interconnected with separate conductors 728 and 730 for interconnecting the terminals A and B with the SLIC input 722. The protection circuit 720 also includes primary protection means 732 interconnected between the terminals A and B and preferably including a carbon black arrestor 734 interconnected between two gas discharge devices 736.

A Wheatstone or diode bridge 738 is also interconnected between the terminals A and B while also being conventionally interconnected with a varistor 740 and a resistor 742 to complete construction of the protection circuit 720.

In the telecommunications field, it is commonly desirable to protect solid-state subscriber loop interface circuits (SLIC) from damage caused by over-voltages occurring in telephone subscriber lines. The most common causes of over-voltage are lightning strikes, induction current from power lines and direct contact of power lines with the SLIC, for example, by accident.

Protection of an SLIC and other telephone components is accomplished by the protection circuit 720 of FIG. 16 which includes one or more circuit protection devices indicated at 726 and constructed according to the present invention. Accordingly, the two devices 726 may each be constructed in accordance with any of the embodiments described above.

The protection circuit 720 conditions over-voltages appearing at the terminals A and B in order to maintain any surge currents within SLIC operating limits.

The gas discharge devices 736 or carbon black arrestor provide primary protection for lightning strikes. Accordingly, the primary protection means 732 meets telecommunications requirements for limiting peak voltages at the terminals A and B to less than 1000 volts, for example.

The circuit protection devices 726 are provided in the protection circuit 720 to ensure that peak current is less than a selected limit, for example, 30 amperes, during a lightning strike or the like. Such a peak current is selected to be well within the ratings for the diode bridge 738 and varistor 740 in order to provide necessary protection for the SLIC.

In operation, for example, when electrical power lines come into contact with telephone lines, the power ratings for the diode bridge 738 and varistor 740 could be easily exceeded, resulting in the destruction of those devices except for the switching action provided by the circuit protection devices 726.

In performing that function, electrical currents exceeding a selected value, for example, 200 milliamperes (mA) passing through the conductors 728 and 730 cause the devices 726 to switch to a high resistance state as described above for absorbing the instantaneous or secondary peaks of current. The increased circuit resistivity in the devices 726 causes electrical current to fall to low levels. If the surge currents prevail, the switch portions in one or both of the devices 726 will electrically disconnect. Consequently, all components in the SLIC 722 or in the primary circuitry 724 will be undamaged by power surges of long duration, resulting, for example, from contact with power line voltages.

When the power line fault voltage is removed from the terminals A and B, the switch portions in the device or devices 726 are allowed to cool and return to a low resistance value whereby the switch portions of the devices 726 are closed. This function, which is also described in detail above for the various embodiments, thereby restores the telecommunications circuit to normal working conditions without damage or significant interruption.

The circuit application described above and illustrated in FIG. 16 is only one example of a use or application for one or more of the circuit protection devices 726. Other circuit applications will be clearly apparent from the preceding description.

Thus, there has been described a number of embodiments of circuit protection devices and a circuit application for employing such a device or devices, all constructed in accordance with the present invention. Numerous modifications and variations are believe apparent in addition to those specifically referred to above. Accordingly, the scope of the present invention is defined only by the following appended claims.

What is claimed is:

1. A device suitable for arrangement in a circuit for protection of components in the circuit, comprising
   a temperature responsive electrical regulating means including a conductive polymer means or ceramic means having an electrical regulating capability dependent on temperature,
   first switch means arranged in series with the temperature responsive electrical regulating means, the switch means including trip means for opening the circuit and positively terminating current flow in a reliable manner, and
   means for connecting the temperature responsive electrical regulating means and first switch means in the circuit,
   the trip means of the first switch means comprising and elongated member responsive to temperature for opening the circuit, the conductive polymer or ceramic means of the temperature responsive electrical regulating means being of cylindrical configuration and surrounding the elongated member in spaced apart relation therefrom in order to assure rapid response of the circuit protection device.

2. A device suitable for arrangement in a circuit for protection of components in the circuit, comprising
   a temperature responsive electrical regulating means including a conductive polymer means or ceramic means having an electrical regulating capability dependent on temperature,
   first switch means arranged in series with the temperature responsive electrical regulating means, the switch means including trip means for opening the circuit and positively terminating current flow in a reliable manner, and
   means for connecting the temperature responsive electrical regulating means and first switch means in the circuit,
   the trip means of the first switch means comprising an elongated member arranged in a conductive housing and responsive to temperature for opening the circuit, the conductive polymer or ceramic means being arranged adjacent to and in conductive relation with the housing in order to assure rapid response of the circuit protection device.

3. The circuit protection device of claim 2 further comprising a second switch means of similar construction as the first switch means and arranged in series with the temperature responsive electrical regulating means and with the first switch means, the conductive polymer or ceramic means being arranged between and in conductive relation with the respective housings for the first and second switch means.

4. A device suitable for arrangement in a circuit for protection of components in the circuit, comprising
   a temperature responsive electrical regulating means including a conductive polymer means or ceramic means having an electrical regulating capability dependent on temperature,
   first switch means arranged in series with the temperature responsive electrical regulating means, the switch means including trip means for opening the circuit and positively terminating current flow in a reliable manner, and
   means for connecting the temperature responsive electrical regulating means and first switch means in the circuit,
   the trip means of the first switch means comprising a ferrite magnetic switch in order to assure rapid response of the circuit protection device.

5. The circuit protection device of claim 4 further comprising a second switch means of similar construction as the first switch means and arranged in series with the temperature responsive electrical regulating means and with the first switch means, the conductive polymer or ceramic means being arranged between and in conductive relation with the respective housings for the first and second switch means.

6. A device suitable for arrangement in a circuit for protection of components in the circuit, comprising
   a temperature responsive electrical regulating means including a conductive polymer means or ceramic means having an electrical regulating capability dependent on temperature,
   first switch means arranged in series with the temperature responsive electrical regulating means, the switch means including trip means for opening the circuit and positively terminating current flow in a reliable manner,
   means for connecting the temperature responsive electrical regulating means and first switch means in the circuit,
   a second switch means of similar construction as the first switch means and arranged in series with the temperature responsive electrical regulating means and with the first switch means.

7. A device suitable for arrangement in a circuit for protection of components in the circuit, comprising
   a temperature responsive electrical regulating means including a conductive polymer means or ceramic means having an electrical regulating capability dependent on temperature,
   first switch means arranged in series with the temperature responsive electrical regulating means, the switch means including trip means for opening the circuit and positively terminating current flow in a reliable manner, and
   means for connecting the temperature responsive electrical regulating means and first switch means in the circuit,
   the trip means of the first switch means comprising an elongated member arranged generally coaxially in a cylindrical housing, the temperature responsive electrical regulating means also being arranged within the housing adjacent one end of the elongated member.

8. The circuit protection device of claim 7 wherein the conductive polymer or ceramic means comprises a conductive material suitable for regulating current flow in the circuit in response to temperature.

9. The circuit protection device of claim 7 wherein the conductive polymer or ceramic means comprises a conductive material suitable for regulating electrical power in the primary circuit in response to temperature.

10. The circuit protection device of claim 7 wherein the first switch means also includes automatic reset means.

11. The circuit protection device of claim 7 wherein the housing is formed from insulation material and the temperature responsive electrical regulating means is in contact with the electrodes.

12. The circuit protection device of claim 11 wherein the housing is conductive and further comprising insulating means mounting the temperature responsive electrical regulating means in the housing.

13. The circuit protection device of claim 12 wherein the conductive polymer or ceramic means is formed with opposite conductive surfaces arranged generally perpendicularly to the axis of the housing, one end of the elongated member being fixed in conductive relation with one of the conductive surfaces.

14. A device suitable for arrangement in a circuit for protection of components in the circuit, comprising
first switch means including an elongated member fixed at one end and arranged generally along the axis of a conductive housing, the housing including a contact point, the elongated member being temperature responsive for moving into and out of engagement with the contact point,
a temperature responsive electrical regulating means arranged in series with the first switch means and including a conductive polymer or ceramic means having an electrical regulating capability dependent on temperature, and
means for connecting the temperature responsive electrical regulating means and the first switch means with the circuit whereby the temperature responsive electrical regulating means provides electrical regulation for the circuit and the switch means positively opens and closes the circuit.

15. The circuit protection device of claim 14 wherein the housing is cylindrical and the elongated member is coaxially arranged in spaced apart relation relative to the housing.

16. The circuit protection device of claim 14 wherein the conductive polymer or ceramic means is arranged in abutting and conductive relation with the conductive housing.

17. The circuit protection device of claim 16 further comprising another switch means of similar construction as the one switch means, the second switch means being arranged in series with the temperature responsive electrical regulating means and with the one switch means, the conductive polymer or ceramic means arranged in abutting and conductive relation with the respective housings for the one switch means and the other switch means.

18. The circuit protection device of claim 14 further comprising another switch means of similar construction as the one switch means, the other switch means being arranged in series with the temperature responsive electrical regulating means and with the one switch means.

19. The circuit protection device of claim 14 wherein the temperature responsive electrical regulating means is arranged within the housing adjacent one end of the elongated member and further comprising insulating means for mounting the temperature responsive electrical regulating means within the conductive housing.

20. The circuit protection device of claim 19 wherein the housing is cylindrical and the conductive polymer or ceramic means is formed with opposite conductive surfaces arranged generally perpendicular to the axis of the housing, one end of the elongated member being fixed in conductive relation with one of the conductive surfaces.

21. The circuit protection device of claim 1 wherein the housing is disc shaped and formed from insulation material, the temperature responsive electrical regulating means being in sheet form arranged within the housing adjacent one end of the electrode and in contact with the elongated switch means.

* * * * *